(12) United States Patent
Happ et al.

(10) Patent No.: US 11,437,164 B2
(45) Date of Patent: Sep. 6, 2022

(54) ELECTRICAL CABLE AND ARRANGEMENT COMPRISING AN ELECTRICAL CABLE

(71) Applicant: TE Connectivity Germany GmbH, Bensheim (DE)

(72) Inventors: Jonas Roland Happ, Weingarten (DE); Martin Listing, Langen (DE); Dinh Hung Vu, Lautertal (DE); Gerzson Toth, Mannheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 189 days.

(21) Appl. No.: 16/838,510

(22) Filed: Apr. 2, 2020

(65) Prior Publication Data
US 2020/0321141 A1    Oct. 8, 2020

(30) Foreign Application Priority Data
Apr. 2, 2019    (DE) .......................... 102019108582.9

(51) Int. Cl.
*H01B 7/02*    (2006.01)
*H01B 13/06*    (2006.01)
(Continued)

(52) U.S. Cl.
CPC ........... *H01B 7/0216* (2013.01); *H01B 13/06* (2013.01); *H01M 50/502* (2021.01); *H01R 12/771* (2013.01); *H01M 2220/20* (2013.01)

(58) Field of Classification Search
CPC ............ H01B 7/04; H01B 7/06; H01R 31/06
See application file for complete search history.

(56) References Cited

U.S. PATENT DOCUMENTS 3,818,122 A * 6/1974 Luetzow ................. H01B 7/04
174/86
4,026,011 A * 5/1977 Walton ................. H01R 12/62
29/846
(Continued)

FOREIGN PATENT DOCUMENTS

DE    202017100537.2 U1    3/2017
EP    2 690 632 A1    1/2014

OTHER PUBLICATIONS

German Office Action, dated Dec. 9, 2019, 10 pages.
(Continued)

*Primary Examiner* — Jean F Duverne
(74) *Attorney, Agent, or Firm* — Barley Snyder

(57) ABSTRACT

An electrical cable includes a plurality of electrical lines extending from a first section to a third section through a second section. Each electrical line is enveloped by an insulating sheath. The electrical lines are arranged side-by-side in the first section in a first plane and in the third section in a third plane. The insulating sheath is integrally formed as a first insulating section in the first section and as a third insulating section in the third section. The insulating sheath is divided into a first further insulating section and a second further insulating section in the second section that are separated from each other by a gap. The first further insulating section is guided from the first insulating section to the third insulating section in a first arcuate path and the second further insulating section is guided from the first insulating section to the third insulating section in a second arcuate path.

20 Claims, 4 Drawing Sheets

(51) Int. Cl.
    *H01R 12/77*     (2011.01)
    *H01M 50/502*   (2021.01)

(56) References Cited

U.S. PATENT DOCUMENTS

| | | | | |
|---|---|---|---|---|
| 4,845,315 | A | * | 7/1989 | Stopper ................ H01B 7/0846 361/827 |
| 4,880,943 | A | * | 11/1989 | Kuzuno ............... H01B 7/0853 174/72 A |
| 4,898,544 | A | * | 2/1990 | Callahan ................ H01R 12/67 439/470 |
| 4,954,100 | A | * | 9/1990 | McCleerey ............ H01R 31/06 439/492 |
| 2008/0085446 | A1 | | 4/2008 | Schmidt et al. |
| 2013/0312999 | A1 | | 11/2013 | Lin |
| 2018/0019451 | A1 | * | 1/2018 | Zhao ................... H01M 50/502 |
| 2018/0084644 | A1 | | 3/2018 | Matsuda |

OTHER PUBLICATIONS

Abstract of DE 20 2017 100537, dated Mar. 30, 2017, 1 page.
Extended European search report, EP App. No. 20165920.8-1201, dated Jul. 24, 2020, 9 pages.

* cited by examiner

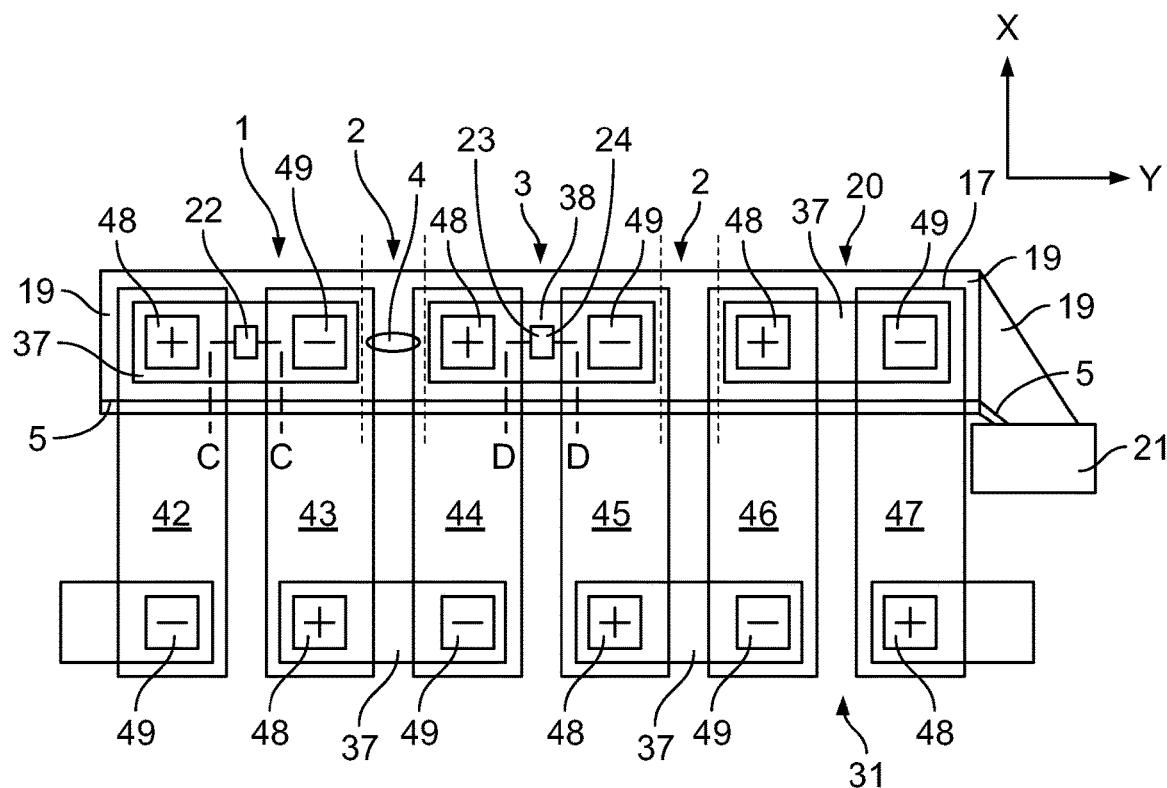
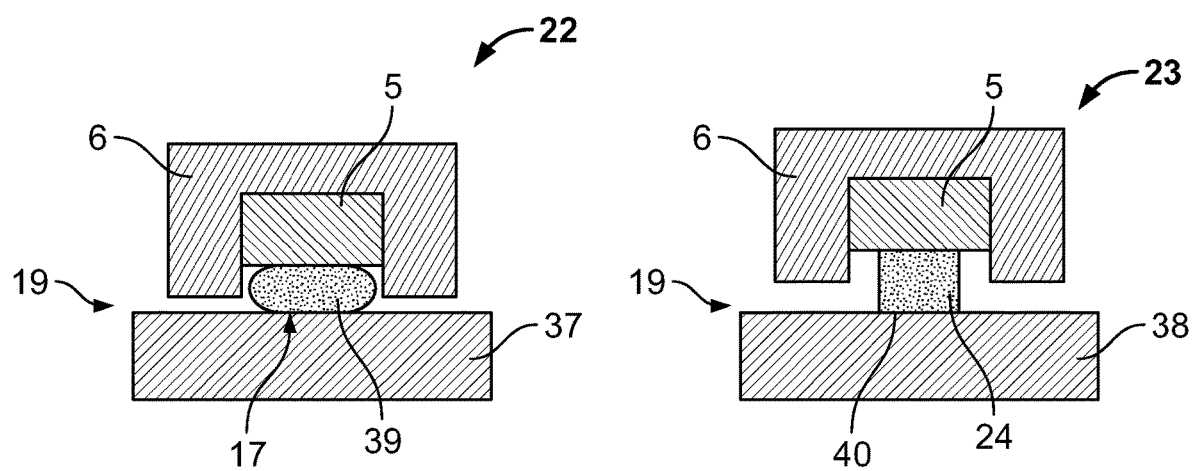
Fig. 8
C-C
Fig. 9
D-D
Fig. 10

ELECTRICAL CABLE AND ARRANGEMENT COMPRISING AN ELECTRICAL CABLE

CROSS-REFERENCE TO RELATED APPLICATION

This application claims the benefit of the filing date under 35 U.S.C. § 119(a)-(d) of German Patent Application No. 102019108582.9, filed on Apr. 2, 2019.

FIELD OF THE INVENTION

The present invention relates to an electrical cable and, more particularly, to an electrical cable with a plurality of electrical lines.

BACKGROUND

Electrical contacts are commonly connected by electrical cables. For example, flat ribbon cables can be used to connect electrical contacts of a battery. The electrical cable is meant to permanently and reliably guarantee the electrical contact between the contact elements, even when there are temperature fluctuations.

SUMMARY

An electrical cable includes a plurality of electrical lines extending from a first section to a third section through a second section. Each electrical line is enveloped by an insulating sheath. The electrical lines are arranged side-by-side in the first section in a first plane and in the third section in a third plane. The insulating sheath is integrally formed as a first insulating section in the first section and as a third insulating section in the third section. The insulating sheath is divided into a first further insulating section and a second further insulating section in the second section that are separated from each other by a gap. The first further insulating section is guided from the first insulating section to the third insulating section in a first arcuate path and the second further insulating section is guided from the first insulating section to the third insulating section in a second arcuate path.

BRIEF DESCRIPTION OF THE DRAWINGS

The invention will now be described by way of example with reference to the accompanying Figures, of which:

FIG. 8 is a schematic plan view of an arrangement of battery cells with a cable;
FIG. 9 is a schematic sectional view through a connection point of the cable of FIG. 8 to a first contact element, taken along line C-C of FIG. 8;
and
FIG. 10 is a schematic sectional view through a subregion of the cable of FIG. 8 in a region of a sensor, taken along line D-D of FIG. 8.

DETAILED DESCRIPTION OF THE EMBODIMENT(S)

The present invention will now be more fully described hereinafter with reference to the accompanying drawings, in which exemplary embodiments of the invention are shown. The present invention may, however, be embodied in many different forms and should not be construed as limited to the embodiments set forth herein. Rather, these embodiments are provided so that the disclosure will convey the scope of the invention to those skilled in the art. Like numbers refer to like elements throughout.

Figure 1:
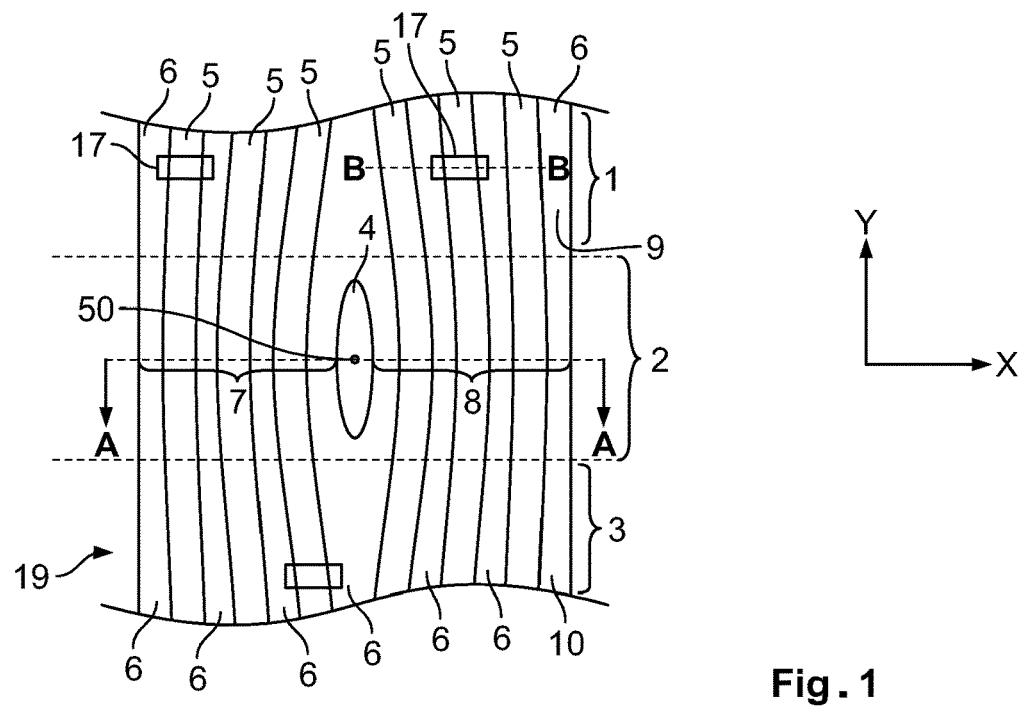
FIG. 1 is a schematic plan view of a section of a cable.

A cable 19 according to an embodiment, as shown in FIG. 1, comprises a first section 1, a second section 2, and a third section 3 in a longitudinal direction of the cable 19. The cable 19, in the shown embodiment, has six electrical lines 5, which are embedded in an insulating sheath 6 and which are guided from the first section 1 to the third section 3 via the second section 2. The electrical lines 5 are orientated substantially along a longitudinal direction in the y axis. In addition, the electrical lines 5 are orientated substantially side-by-side along a transverse direction along an x axis.

In the first and in the third section 1, 3, as shown in FIG. 1, the insulating sheaths 6 of the lines 5 are configured integrally and form a first insulating section 9 in the first section 1 and a third insulating section 10 in the third section 3. Two further insulating sections 7, 8 are configured in the second section 2, with the further insulating sections 7, 8 being separated from each other by a gap 4. The gap 4 is introduced in the insulating material spaced apart from two neighboring electrical lines 5. In the shown embodiment, the first further insulating section 7 has three electrical lines 5. The second further insulating section 8 has three electrical lines 5. The electrical lines 5 of the first and of the second further insulating section 7,8 are guided laterally in the direction of the X axis around a center point 50 of the cable 19 corresponding to the arcuate form of an edge region of the gap 4 on paths of curvature. The second section 2 can, as a result of the gap 4, have a greater width along the X axis than the first and the third section 1,3.

In addition, in the first section 1, additional or further lines 5 can be configured either integrally in the first insulating section 9 or as separately guided lines. In a similar way, additional electrical lines 5 can be configured in the third insulating section 10 too, which additional electrical lines 5 are supplied either integrally in the third insulating section 10 or as separate lines 5, which can be connected to the third insulating section 10 in sections.

In the first insulating section 9, as shown in FIG. 1, a pair of recesses 17 are introduced, which are each guided as far as an electrical line 5. A recess 17 is also introduced in the third insulating section 10, which recess 17 is guided as far as an electrical line 5.

Figure 2:
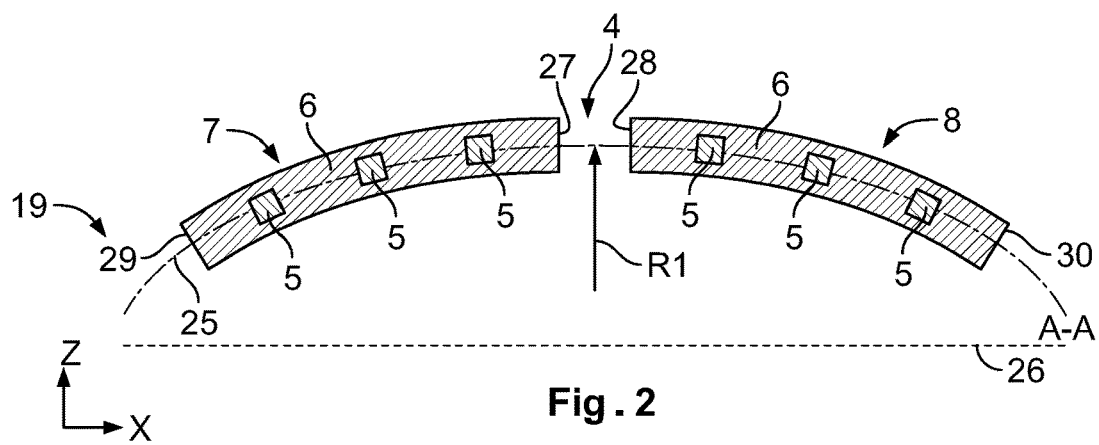
FIG. 2 is a schematic sectional view of the cable.

FIG. 2 shows a cross-section A-A of FIG. 1 in the region of the second section 2. The first and the second further insulating sections 7, 8 are depicted in cross-section, with the two further insulating sections 7, 8 each having a curvature or path of curvature 25 arranged perpendicular to the longitudinal extent. In the shown embodiment, the first and the second further insulating section 7, 8 lie on a common path of curvature 25. The path of curvature 25 has a specified first radius R1, for example. The first radius R1, in an embodiment, can have values between 1 cm and 5 cm, for example. However, in other embodiments, the first radius R1 can also adopt other values. Depending on the selected embodiment, the first and the second further insulating section 7, 8 can also have different curvatures with different radii.

A first plane 26 is depicted schematically as a dashed line in FIG. 2, in which the first section 1 of the cable 19 is located. The first and the second further insulating section 7, 8 are separated by the gap 4 and are spaced apart from each other laterally. Inner edge regions 27, 28 of the first and of the second further insulating section 7, 8 are arranged at approximately the same level. Outer edge regions 29, 30 of the first and of the second further insulating section 7, 8 are arranged closer to the first plane 26. Depending on the selected embodiment, the outer edge regions 29, 30 can be arranged at the level of the first plane 26 or adjacent to the level of the first plane 26. Thus, the first and second further insulating sections 7,8 can represent, in the Z-X plane, a partial circle which is smaller than a semicircle, or a semicircle.

The first and the second further insulating sections 7, 8 each have a rectangular form in cross-section perpendicular to the Y axis, i.e. in the Z-X plane as shown in FIG. 2. In addition, the electrical lines 5 of the first and of the second further insulating section 7, 8 are configured with a rectangular cross-section. The cross-sections of the further insulating sections 7, 8 and/or of the electrical lines 5 can also have other forms.

Depending on the selected embodiment, the gap 4 can be configured by a slot in the insulating material, that is to say without a substantial removal of insulating material. In another embodiment, the slot 4 can be configured by removal, that is to say by introducing a continuous recess in the insulating material. For example, the slot 4 can have a form which tapers in the direction of the first section 1 and in the direction of the third section 3. A slot 4 can, depending on the selected design, have a length of 5 mm to 15 mm, for example.

Figure 3:
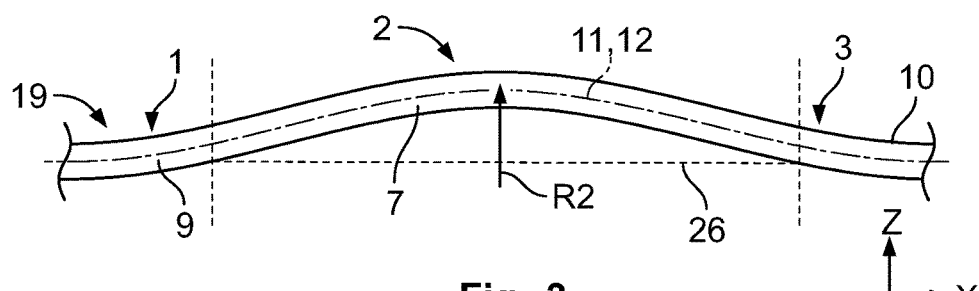
FIG. 3 is a schematic side view of the cable.

FIG. 3 shows a side view of the cable 19, with the first insulating section 9 and the third insulating section 10 being arranged on the first plane 26 in the example. The first plane 26 is drawn schematically in the form of a dashed line. In FIG. 3, the first further insulating section 7 is depicted schematically. In the longitudinal direction, that is to say in the Y direction, the first and the second further insulating section 7, 8 extend on a first or second arcuate path 11, 12. The arcuate paths 11,12 emerge smoothly out of the first plane 26 of the first insulating section 9, and merge smoothly again into the first plane 26 of the second insulating section 10. The first and second paths 11, 12 have no kinks or significant bends. In FIG. 3, the arcuate path 11, 12 is depicted schematically as a centered path transversely over the cross-section of the first and of the second further insulating section 7, 8 respectively.

As a result of the smooth and uniform transitions without kinks and without significant bends and as a result of the smooth and uniform first and second paths 11, 12, the cable 19 is subjected to less stress when the first and the third section 1, 3 undergo a relative displacement with respect to each other. Thus, a displacement of the two contact elements or also a change in the length of the electrical cable 19 can be compensated with less stress on connecting sites between the first section 1 and the first contact element and the third section 3 and the second contact element. Furthermore, as a result of the configuration of the first further insulating section 7 in the form of a first arcuate path 11 and as a result of the configuration of the second further insulating section 8 in the form of a second arcuate path 12 between the first and the third section 1, 3, a length of the electrical cable 19 is kept ready in order to enable a change in position of the first section 1 relative to the third section 3.

In an embodiment, the further insulating sections 7, 8 are formed in an elastically resilient manner in the first and in the second path 11, 12, respectively, in such a way that, after an expansion or compression of the further insulating sections 7, 8 out of the first and/or the second arcuate path 11, 12, the insulating sections 7, 8 are biased in the direction of the first and/or the second arcuate path 11, 12. In this way, a defined form of the first and of the second further insulating sections 7, 8 with correspondingly set elastic and resilient properties is provided. In addition, the cable 19 thus has specified elastically resilient expansion sections in the second section 2.

The first and second arcuate paths 11, 12 have a specified second radius R2, for example, as shown in FIG. 3. The second radius R2 can have values between 1 cm and 5 cm, for example. The second radius R2, however, can also have other values in other embodiments. Depending on the selected embodiment, it is not necessary for the first and second further insulating sections 7, 8 to actually have an arcuate path 11, 12 in the form of a partial circle, but rather the first and the second further insulating section 7, 8 can have any type of path which is curved with respect to the plane of the first and third insulating sections 9, 10. In addition, the first and second arcuate paths 11, 12 can also have the form of at least one semicircle.

Depending on the selected embodiment, the first and second insulating sections 9, 10 can be arranged on different planes offset in relation to each other along the Z axis or also can have a partially arcuate and/or curved path. Thus, the second section 2 of the cable 19 can have at least the form of a part-spherical surface, in particular the form of a hemispherical surface. Depending on the design, the second section 2 can also have the form of another surface which is arched in the three axes X, Y, Z.

The paths of curvature 11, 12 are complementary transverse to the longitudinal extent of the second section 2. In this case, the first and the second further insulating section 7, 8 are adjacent to each other in a highest point of the common path of curvature. Lateral outer edge regions of the first and of the second further insulating section 7, 8 form end points of the path of curvature 11, 12 which are deeper and arranged closer to the plane 26 of the first and of the second section 1, 2.

Figure 4:
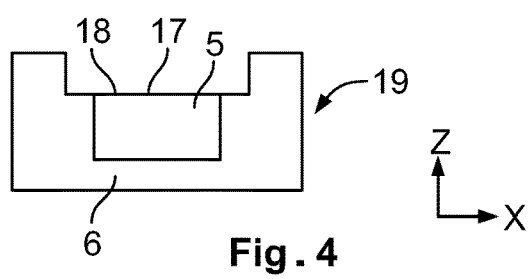
FIG. 4 is a schematic sectional view of a portion of the cable in a region of an aperture.

FIG. 4 shows, in a schematic depiction, a cross-section B-B through the cable 19 of FIG. 1 in the region of the recess 17. The recess 17 extends from an outer side of the insulating material 6 of the cable 19 up to a contact area 18 of the line 5. Thus, the line 5 is exposed in the region of the recess 17 with the contact area 18 and can be used for electrical and/or mechanical connections, e.g. to a sensor or a contact element.

Figure 5:
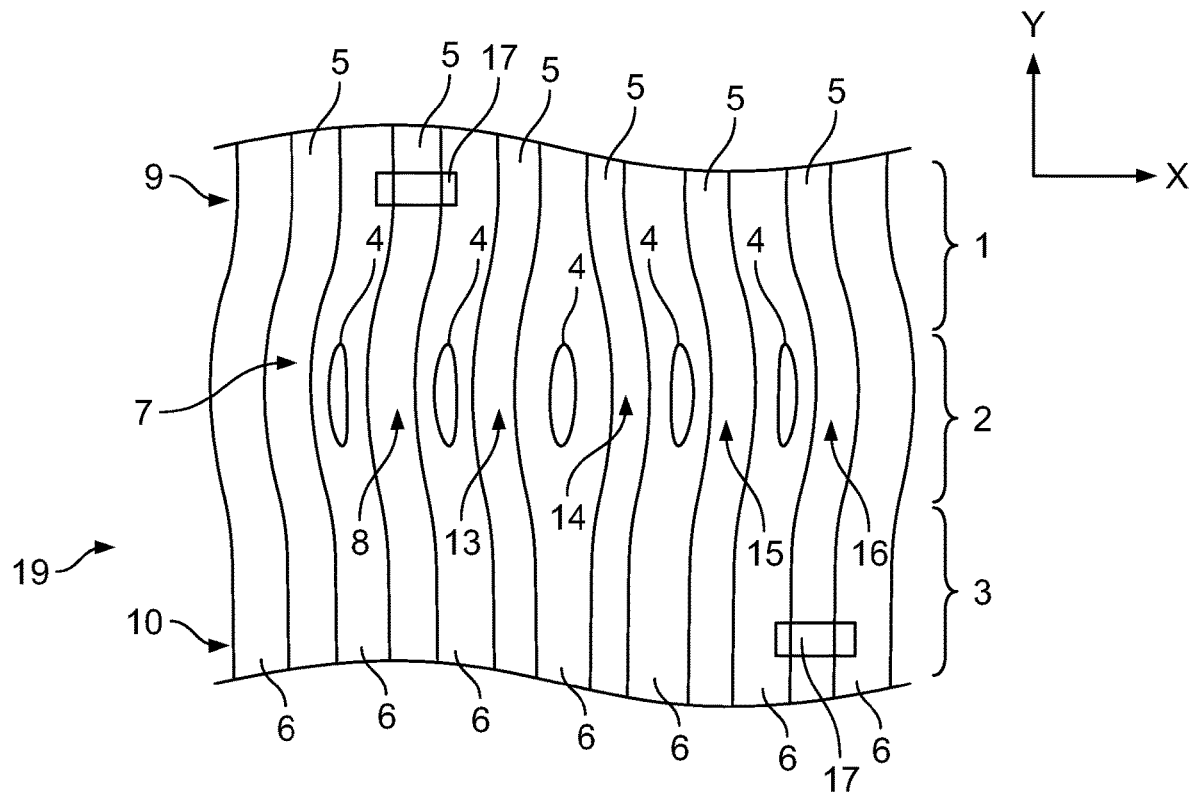
FIG. 5 is a schematic plan view of a cable according to another embodiment.

FIG. 5 shows, in a schematic depiction, a plan view of a further embodiment of a cable 19, which is configured substantially in accordance with the embodiment of FIG. 1, but with several further insulating sections 7, 8, 13, 14, 15, 16 being supplied in the second section 2. In the depicted exemplary embodiment, each electrical line 5 in the second section 2 is separated from the neighboring electrical line 5 by a gap 4, with the gap 4 being introduced into the insulating layer. The electrical lines 5 are also completely enveloped by an insulating sheath 6 in the region of the second section 2. Thus, in this design too, the second section 2 of the cable 19 can have at least the form of a part-spherical surface, in particular the form of a hemispherical surface. Depending on the design, the second section 2 can also have the form of another surface which is arched in the three axes X, Y, Z.

Figure 6:
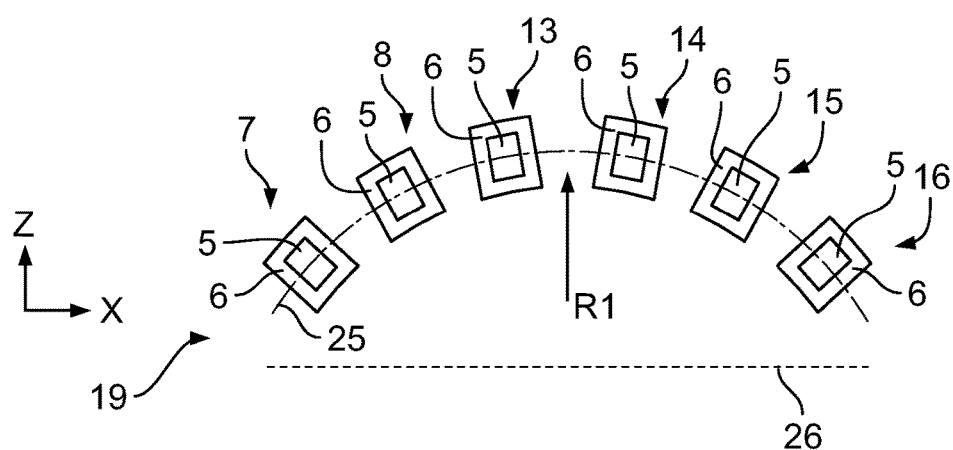
FIG. 6 is a schematic sectional view of the cable of FIG. 5.

FIG. 6 shows, in a schematic depiction, a cross-section through the second section 2 of the cable 19 of FIG. 5. The further insulating sections 7, 8, 13, 14, 15, 16 are arranged on a path of curvature 25. The path of curvature 25 has a set first radius R1, for example. In addition, the first plane 26 of the first and of the third insulating section 9, 10 is depicted as a dashed line. The further insulating sections 7, 8, 13, 14, 15, 16 each have a line 5 and an insulating sheath 6. The described cable 19 has an increased flexibility on account of the second section 2, in which gaps 4 are introduced into the insulating material 6 and several further insulating sections 7, 8, 13, 14, 15, 16 are configured. In the depicted example, the section 2 in cross-section is configured perpendicular to the Y axis as a partial circle with the first radius R1. The partial circle covers less than the semicircle. Depending on the selected design, the section 2 of the cable 19 of FIG. 5 can also cover a semicircle also in cross-section perpendicular to the longitudinal axis Y.

As a result of the form of the further insulating sections 7, 8, 13, 14, 15, 16 in the form of arcuate paths transverse to the longitudinal extent (Y axis) and along the longitudinal extent in the second section 2, cable length is kept ready for a relative displacement of the first and of the third section 1, 3. Furthermore, as a result of the arrangement of the further insulating sections 7, 8, 13, 14, 15, 16 on or along a path of curvature 25, which arrangement is configured perpendicular to the longitudinal extent of the cable 19 in the second section 2, an improved flexibility with respect to a lateral displacement along the x axis and/or twisting of the first and/or of the third section 1, 3, is provided.

The cable 19 is configured to enable a mechanical and/or an electrical contact between the cable 19 and two contact elements. The cable 19 is suitable for compensating changes in the length of the cable 19 and/or changes in the spacing between the contact elements; changes in the spacings between the first section 1 and the third section 3 can be compensated with less opposing force. In addition, the cable 19 has an increased flexibility in a direction arranged laterally in relation to the longitudinal extent of the cable 19. These advantages are achieved with the proposed electrical cable 19 that has the first section 1, the second section 2, and the third section 3. In another embodiment, the cable 19 can be used in order to be connected to a multiplicity of contact elements as flexibly and elastically as possible. In addition, the cable can be provided as an intermediate product, which is subdivided into corresponding shorter cables or cable sections, depending on the desired number of first, second and third sections 1, 2, 3.

Figure 7:
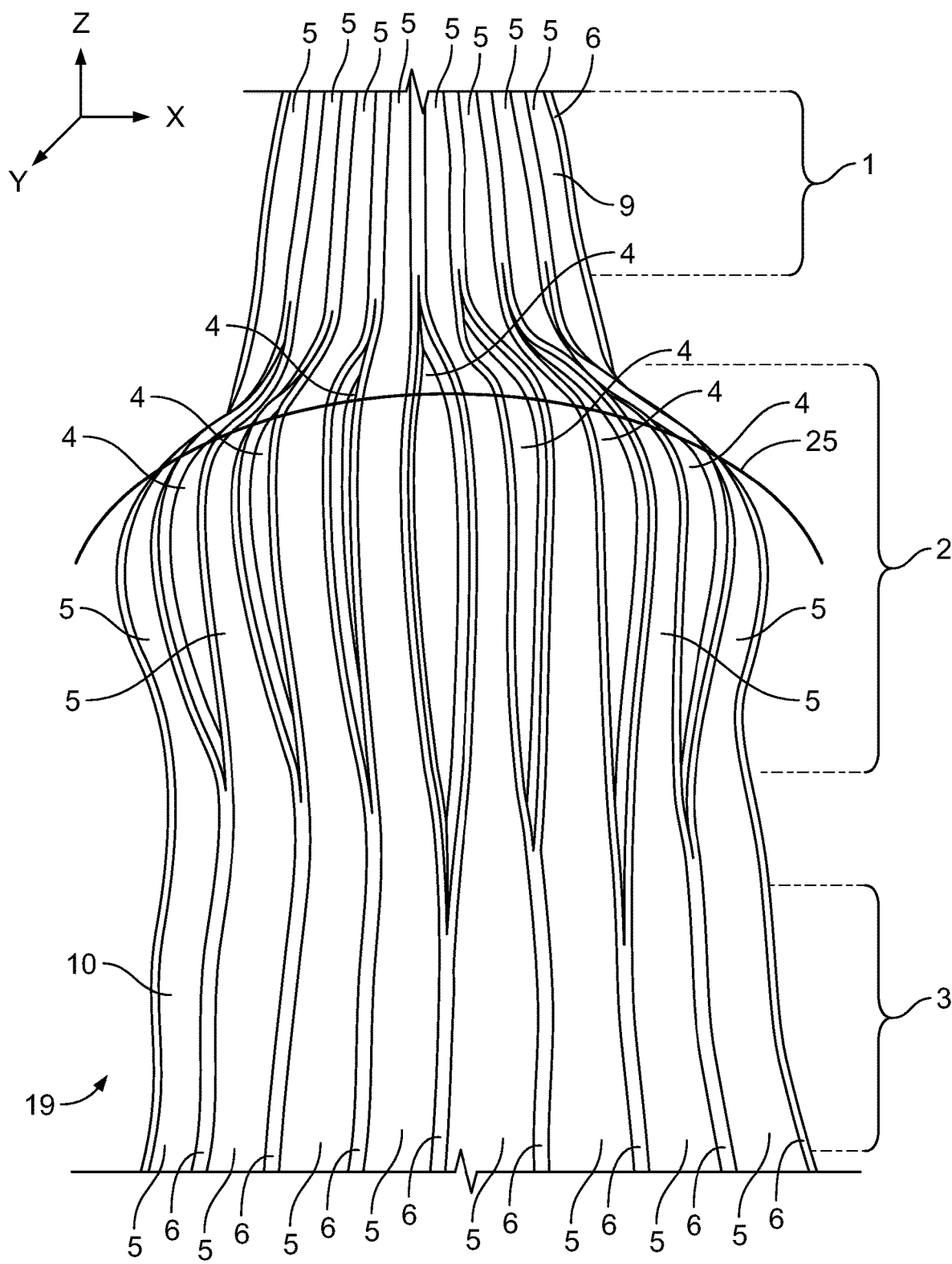
FIG. 7 is a schematic perspective view of the cable of FIG. 5.

FIG. 7 shows, in a schematic perspective depiction, the cable 19 of FIG. 5, which has further insulating sections 7, 8, 13, 14, 15, 16 in the second section 2, which further insulating sections 7, 8, 13, 14, 15, 16 are arranged in the form of a hemispherical surface. In the region of the second section 2, the path of curvature 25 of the further insulating sections in the Z-X plane is shown schematically in the form of a solid line. As shown in FIG. 7, the two outer edge regions of the second section 2 are arranged on one plane. In the X direction perpendicular to the longitudinal extent of the cable, the second section 2 has a greater width than in the first section 1 or in the third section 3. The width of the first section 1 is the same as the width of the third section 3.

A battery 31 according to an embodiment, as shown in FIG. 8, has several battery cells 42, 43, 44, 45, 46, 47. The battery cells 42-47 each have a positive pole 48 and a negative pole 49. The positive pole 48 and the negative pole 49 may also be referred to as contacts elements of the cells 42-27. The positive poles 48 are denoted by a plus symbol. The negative poles 49 are denoted by a minus symbol. Depending on the electrical circuitry, the battery cells 42-47 can be connected in series or in parallel. In the shown embodiment, the battery cells 42-47 are electrically connected in series. For this purpose, a positive pole 48 of a battery cell is connected to a negative pole 49 of a neighboring battery cell via an electrically conductive connecting element or contact element 37.

To detect electrical voltages of the battery cells 42-47 or to detect temperatures of the battery cells 42-47, a cable 19, which is depicted schematically as a transparent strip, is guided along the row arrangement at a first row of poles over the battery cells 42-47 of the battery 31. To simplify the depiction, only one electrical line 5 of the cable 19 is drawn schematically, which runs along the row of poles of the first side of the battery 31. All the other electrical lines 5 of the cable 19 run in the same direction. The cable 19 is configured in accordance with one of the above-described exemplary embodiments.

The cable 19 is connected to the connecting element 37 at a first connection point 22, as shown in FIG. 8. At the first connection point 22, an electrical line 5 is directly or indirectly connected electrically and/or mechanically to the connecting element 37. The first connection point 22 is configured in the first section 1 of the cable 19. Furthermore, a second connection point 23 is supplied, which is electrically and/or mechanically connected to a further connecting element or second contact element 38. The connecting elements 37, 38 are depicted schematically as rectangles. The second connection point 23 is configured in the third section 3 of the cable 19. Between the first and the third section 1, 3, the second section 2 of the cable 19 is configured with the at least two further insulating sections 7, 8. A gap 4 is drawn schematically in the second section 2. Depending on the selected embodiment, more than just one gap 4 is also supplied in the second section 2. In particular, the cable 19 is configured in accordance with FIG. 7. Depending on the selected embodiment, the second connection point 23 can also be electrically and/or mechanically connected to the same connecting element 37 as the first connection point 22.

In the embodiment shown in FIG. 8, the cable 19 is guided with the electrical lines 5 to a control unit 21, for example, which is configured at the battery 31. Parameters such as voltage, current or temperature of the battery cells 42-47, for example, can be detected via the electrical lines 5 of the cable 19 and forwarded to a further unit such as the control unit 21, for example. The first and the second connection point 22, 23 are produced, for example, by recesses in the first or third section 1, 3 of the cable 19.

Battery cells 42-47 also exhibit a change in size when there is a change in temperature; the size of the battery cell 42-47 increases with temperature. In addition, the battery cells 42-47 can be displaced against each other over the course of time as a result of corresponding vibrations during operation of the vehicle. If the battery cells 42-47 abut each other, the electrical poles 48, 49 and also further electrical terminals, which are connected to the battery cells 42-47, are moved relative to each other when there are temperature fluctuations in the battery 31. In the case of a multiplicity of battery cells 42-47, this leads in particular to a change in the spacing between the electrical poles 48, 49 of the battery cells 42-47. The electrical cable 19 allows a high degree of elastic flexibility. As a result, the connecting sites between the electrical cable 19 and the contact elements or the battery cells 42-47 are put under less stress. Thus, a multiplicity of thermally induced changes in the spacing between the contact elements of battery cells 42-47 can be compensated permanently and safely with the aid of the cable 19.

FIG. 9 shows, in a schematic depiction, a cross-section C-C through the first connection point 22, in which the electrical line 5 is connected to the connecting element 37 via the recess 17 and an electrically conductive connecting material 39 such as solder, for example.

FIG. 10 shows a cross-section D-D through the second connection point 23, in which the electrical line 5 is connected to a sensor 24, with the sensor 24 in turn being mechanically connected to the further connecting element 38 or the connecting element 37 via a connecting layer 40. The connecting layer 40 can be produced by a thermally conductive adhesive, for example.

Depending on the selected embodiment, both the first and the second connection point 22, 23 can have an electrically conductive connection between an electrical line 5 and the connecting elements 37, 38. In addition, depending on the selected embodiment, both the first and the second connection point 22, 23 can have only one mechanical connection to the connecting element 37 and the further connecting element 38, for example via a sensor 24.

Instead of the arrangement with battery cells 42-47 which is depicted in the example of FIG. 8, the cable 19 with the first, second and third sections 1, 2, 3 can also be electrically and/or mechanically attached to other contact elements in the region of the first section 1 and in the region of the third section 3.

The electrical cable 19 with the first, second and third sections 1, 2, 3 can be manufactured from a flat ribbon cable or from an FFC foil conductor, for example, with at least one gap 4 being introduced into the insulating material of the cable 19 in the second section 2 between only two neighboring electrical lines 5. Depending on the selected embodiment, several gaps 4 can be introduced into the second section 2 of the cable 19 with or without removal of insulating material.

The electrical lines 5 and/or the insulating material can be permanently embossed or pressed into the desired form in the second section 2 of the cable 19 with the aid of pressure and/or heat and an appropriate forming surface. For example, a partial sphere or a sphere can be used as the forming surface. As a result, both the form of the paths of the further insulating sections 7, 8 along the longitudinal direction of the cable 19 and the paths of curvature of the further insulating sections 7, 8 can be specified and set transverse to the longitudinal extent of the cable 19. Thus, the second section 2 of the cable 19 can be formed permanently at least into the form of a part-spherical surface, in particular into the form of a hemispherical surface. Depending on the design, the second section 2 can also have the form of another surface which is arched in the three axes X, Y, Z.

The electrical and mechanical connections between the electrical lines 5 and the contact elements can be manufactured, for example, with the aid of a welded connection, a soldered connection or an electrically insulating or electrically conductive adhesive.

Depending on the selected embodiment, the cable 19 can have six to eight, twelve or also more electrical lines 5. The electrical lines 5 can be configured as voltage lines or as sensor lines. For example, the electrical lines 5 can be 1 to 2 mm wide and 0.4 to 0.8 mm thick in cross-section. In the embodiment as sensor lines, the electrical lines 5 can have a smaller cross-section and for example can be 0.8 to 1.2 mm wide and 0.2 to 0.4 mm thick. The cable 19 can have a width of e.g. 10 mm to 30 mm in the X axis. The lines 5 are formed from copper, for example. An NTC or PTC resistance sensor, for example, can be supplied as the sensor. The sensor can, for example, be soldered to the contact element, in particular to a contact element of a battery cell, or connected via an adhesive layer. Irrespective of use of the battery cells 42-47 and in particular irrespective of use in the automotive industry, the cable 19 and the proposed arrangement can also be employed in other technical areas.

The gaps 4 can be introduced into the insulating material of the insulating sheaths 6, for example, with the aid of a laser cutting method or a stamping method. The insulating material for the insulating sheaths 6 of the electrical lines can be formed from plastic, for example.

What is claimed is:

1. An electrical cable, comprising:
a plurality of electrical lines extending from a first section to a third section through a second section, each electrical line is enveloped by an insulating sheath in each of the first section, the second section, and the third section, the electrical lines are arranged side-by-side in the first section in a first plane and are arranged side-by side in the third section in a third plane, the insulating sheath of each of the lines is integrally formed as a first insulating section in the first section and is integrally formed as a third insulating section in the third section, the insulating sheath of the electrical lines is divided into a first further insulating section and a second further insulating section in the second section, the first further insulating section and the second further insulating section are separated from each other by a gap, the first further insulating section is guided from the first insulating section to the third insulating section in a first arcuate path and the second further insulating section is guided from the first insulating section to the third insulating section in a second arcuate path, the first further insulating section and the second further insulting section are formed in an elastically resilient manner in the first arcuate path and the second arcuate path.

2. The electrical cable of claim 1, wherein the first further insulating section has a first curvature perpendicular to the first arcuate path and the second further insulating section has a second curvature perpendicular to the second arcuate path.

3. The electrical cable of claim 1, wherein the insulating sheath of the electrical lines is divided into a plurality of additional further insulating sections in the second section in addition to the first further insulating section and the second further insulating section.

4. The electrical cable of claim 3, wherein the additional further insulating sections are each separated from each other by a gap and are each guided in a further arcuate path from the first insulating section to the third insulating section.

5. The electrical cable of claim 4, wherein each of the additional further insulating sections has a further curvature perpendicular to the further arcuate path.

6. The electrical cable of claim 4, wherein the first further insulating section, the second further insulating section, and the additional further insulating sections are arranged perpendicular to a longitudinal extent of the insulating sections on a path of curvature.

7. The electrical cable of claim 4, wherein at least one of the first further insulating section, the second further insulating section, and the additional further insulating sections has only one electrical line with an insulating sheath.

8. The electrical cable of claim 1, wherein the second section is formed as a part-spherical surface that is arcuate in three axes.

9. The electrical cable of claim 8, wherein the first further insulating section and the second further insulating section are arranged on the part-spherical surface.

10. The electrical cable of claim 1, wherein, after an expansion or compression of the first further insulating section and the second further insulating section out of the first arcuate path and the second arcuate path, the first further insulating section and the second further insulating section are biased in a direction toward the first arcuate path and the second arcuate path.

11. The electrical cable of claim 1, wherein the gap tapers in a direction of at least one of the first section and the third section.

12. An arrangement, comprising:
a first contact element; and
an electrical cable including a plurality of electrical lines extending from a first section to a third section through a second section, each electrical line is enveloped by an insulating sheath in each of the first section, the second section, and the third section, the electrical lines are arranged side-by-side in the first section in a first plane and are arranged side-by side in the third section in a third plane, the insulating sheath of each of the lines is integrally formed as a first insulating section in the first section and is integrally formed as a third insulating section in the third section, the insulating sheath of the electrical lines is divided into a first further insulating section and a second further insulating section in the second section, the first further insulating section and the second further insulating section are separated from each other by a gap, the first further insulating section is guided from the first insulating section to the third insulating section in a first arcuate path and the second further insulating section is guided from the first insulating section to the third insulating section in a second arcuate path, the first further insulating section and the second further insulting section are formed in an elastically resilient manner in the first arcuate path and the second arcuate path, the first insulating section is arranged at the first contact element and one of the electrical lines in the first insulating section is connected to the first contact element, the third insulating section is arranged at the first contact element or at a second contact element and one of the electrical lines of the third insulating section is connected to the first contact element or the second contact element, the second section is arranged between the first insulating section and the third insulating section.

13. The arrangement of claim 12, wherein the first contact element is connected to a first battery cell and/or the second contact element is connected to a second battery cell.

14. The arrangement of claim 13, wherein the first contact element is connected to an electrical pole of the first battery cell and the second contact element is connected to an electrical pole of the second battery cell.

15. The arrangement of claim 14, wherein the first contact element and/or the second contact element are each an electrically conductive connecting element electrically connecting the electrical pole of the first battery cell to the electrical pole of the second battery cell.

16. The arrangement of claim 12, wherein the first insulating section and/or the second insulating section has a recess adjacent to at least one of the electrical lines.

17. The arrangement of claim 16, wherein the electrical lines in a region of the recess are electrically conductively connected to the first contact element or the second contact element.

18. The arrangement of claim 16, wherein the electrical lines in a region of the recess are electrically conductively connected to a sensor, the sensor is attached to the first contact element or the second contact element.

19. The arrangement of claim 13, wherein the first battery cell and the second battery cell form a drive battery of a vehicle.

20. A method for manufacturing an electrical cable, comprising:
providing the electrical cable having a plurality of electrical lines extending from a first section to a third section through a second section, each electrical line is enveloped by an insulating sheath in each of the first section, the second section, and the third section, the electrical lines are arranged side-by-side in the first section in a first plane and are arranged side-by side in the third section in a third plane, the insulating sheath of each of the lines is integrally formed as a first insulating section in the first section and is integrally formed as a third insulating section in the third section, the insulating sheath of the electrical lines is divided into a first further insulating section and a second further insulating section in the second section, the first further insulating section and the second further insulating section are separated from each other by a gap, the first further insulating section is guided from the first insulating section to the third insulating section in a first arcuate path and the second further insulating section is guided from the first insulating section to the third insulating section in a second arcuate path, the first further insulating section and the second further insulting section are formed in an elastically resilient manner in the first arcuate path and the second arcuate path.

* * * * *